(12) United States Patent
Tran et al.

(10) Patent No.: US 6,187,515 B1
(45) Date of Patent: Feb. 13, 2001

(54) OPTICAL INTEGRATED CIRCUIT MICROBENCH SYSTEM

(75) Inventors: Dean Tran, Westminster; Eric R. Anderson, Redondo Beach; Ronald L. Strijek, Vista; Edward A. Rezek, Torrance, all of CA (US)

(73) Assignee: TRW Inc., Redondo, CA (US)

( * ) Notice: Under 35 U.S.C. 154(b), the term of this patent shall be extended for 0 days.

(21) Appl. No.: 09/074,188

(22) Filed: May 7, 1998

(51) Int. Cl.[7] .................................................. G02B 6/36
(52) U.S. Cl. ........................ 430/321; 385/49; 385/39; 385/88; 385/52
(58) Field of Search ......................... 385/49, 39, 88, 385/52; 430/321, 320

(56) References Cited

U.S. PATENT DOCUMENTS

| | | | |
|---|---|---|---|
| 4,349,410 | * 9/1982 | Stupp et al. | 156/654 |
| 4,354,898 | * 10/1982 | Coldren et al. | 156/647 |
| 4,433,898 | 2/1984 | Nasiri | 350/96.17 |
| 4,464,458 | * 8/1984 | Chow et al. | 430/312 |
| 4,613,398 | * 9/1986 | Chion et al. | 156/628 |
| 4,653,847 | 3/1987 | Berg et al. | 350/96.2 |
| 4,875,750 | 10/1989 | Spaeth et al. | 350/96.18 |
| 4,923,564 | * 5/1990 | Bilakanti et al. | 156/655 |
| 5,073,003 | * 12/1991 | Clark | 385/88 |
| 5,145,793 | * 9/1992 | Oohara et al. | 437/5 |
| 5,155,778 | * 10/1992 | Magel et al. | 385/18 |
| 5,247,597 | 9/1993 | Blacha et al. | 385/39 |
| 5,265,177 | * 11/1993 | Cho et al. | 385/14 |
| 5,270,258 | * 12/1993 | Yoshida et al. | 445/50 |
| 5,343,546 | 8/1994 | Cronin et al. | 385/52 |
| 5,346,583 | 9/1994 | Nagesh | 430/321 |
| 5,452,118 | * 9/1995 | Maruska | 359/191 |
| 5,600,741 | * 2/1997 | Hauer et al. | 385/52 |
| 5,696,862 | * 12/1997 | Hauer et al. | 385/88 |
| 5,761,350 | * 6/1998 | Koh | 385/37 |
| 5,764,832 | * 6/1998 | Tabuchi | 385/49 |
| 5,853,960 | * 12/1998 | Tran et al. | 430/321 |
| 5,872,880 | * 2/1999 | Maynard | 385/88 |
| 5,883,988 | * 3/1999 | Yamamoto et al. | 385/49 |
| 5,911,022 | * 6/1999 | Plickert et al. | 385/49 |

FOREIGN PATENT DOCUMENTS

| | | | |
|---|---|---|---|
| 64-63911 | * 3/1989 | (JP) | 385/88 |
| 3-182705 | * 8/1991 | (JP) | 385/49 |

OTHER PUBLICATIONS

Y. Oikawa, H. Kuwatsuka, T. Tamamoto, T. Ihara, H. Hamano, and T. Minami "Packaging Technology for a 10–Gb/s Photoreceiver Module", Journal of Lightwave Technology, vol. 12, No. 2, Feb. 1992, pp. 343–352.

* cited by examiner

Primary Examiner—Martin Angebranndt
(74) Attorney, Agent, or Firm—Michael S. Yatsko

(57) ABSTRACT

The invention relates to an optical integrated circuit microbench system for accurately aligning optical fiber and waveguides to efficiently couple energy between optical devices. This is accomplished by using the anisotropic etch characteristics of III-V semiconductor materials in two orthogonal directions. One etch direction serves to provide a channel for precise fiber-positioning; the other direction, which is orthogonal provides a reflecting surface for directing the optical energy onto optical devices.

15 Claims, 7 Drawing Sheets

OPTICAL INTEGRATED CIRCUIT MICROBENCH SYSTEM

BACKGROUND OF THE INVENTION

1. Field of the Invention

The present invention relates to a monolithically integrated optical microbench system for coupling optical energy between optical devices and a method for producing the same by using the anisotropic etch characteristics of m-V semiconductors where one orthogonal etch direction provides a natural channel for fiber positioning and the other orthogonal etch direction provides a reflecting surface for the redirection of optical energy between a fiber or waveguide and optical devices.

2. Description of the Prior Art

Compact and simple optical coupling systems for micro-optical devices are essential in optical communication systems. In addition, simplified assembly processes in packaging micro-optical coupling systems are very important in manufacturing low cost and reliable systems. An increasingly popular method for the coupling of optical energy between optical devices and systems is through the use of fiber and micro-optical lenses. Fiber provides an efficient transfer medium between optical devices by providing improvements in coupling efficiency and communication lag. Micro-optical lenses provide additional coupling efficiency by focusing divergent optical energy output from an optical fiber end. Present optical coupling systems use a variety of coupling schemes to obtain efficient coupling between micro-optical devices.

The publication "Packaging Technology for a 10-Gb/a Photoreceiver Module", by Oikawa et al., Journal of Lightwave Technology Vol. 12 No. 2 pp.343–352, February 1994 discloses an optical coupling system containing a slant-ended fiber 10 secured in a fiber ferrule 12 where the fiber ferrule 12 is welded to a side wall 14 of a flat package 16 and a microlens 18 is monolithically fabricated on a photodiode 20 where the photodiode 20 is flip-chip bonded to the flat package 16, as illustrated in FIG. 1. An optical signal 22 enters horizontally and is reflected vertically at the fiber's 10 slant-edge. The microlens 18 then focuses the optical signal 22 on the photodiode's 20 photosensitive area.

In the Olkawa publication, maintaining alignment between the fiber and the photodiode chip is essential for optimal coupling of the optical signal. Misalignment can occur as a result of mechanical stress to the fiber ferrule or thermal fluctuations of the entire system. In an attempt to overcome these factors, complex assembly and fabrication techniques are used. The fiber attachment is a complex ferrule attachment which seeks to optimize the mechanical strength of the attachment and therefore minimize the effects of fiber displacement Because the photodiode chip is flip-chip bonded on the flat package a complex bonding machine is required for high-precision alignment. Finally, in order to provide a high optical coupling efficiency wide misalignment tolerances must be built in to the photodiode chip during fabrication to compensate for both displacement by the fiber attachment and deformation by temperature fluctuation.

Disclosed in U.S. Pat. No. 5,346,583 is a monolithic coupling system for optical energy transfer between a microlens and a fiber, as illustrated in FIG. 2. The configuration disclosed in patent '583 contains at least one preshaped photoresist (PR) microlens 24 formed on a surface 33 of a substrate 34 by standard photolithography steps and on an opposing surface 31 of the substrate 34 an optical fiber guide 26 is formed through standard photolithography steps. The fiber guide 26 is used to mount an optical fiber 28 such that the central axis 30 of the optical fiber 28 is substantially coincident with the central axis 32 of the PR microlens 24. While the proximity of the fiber 28 to the microlens 24 allows for efficient coupling of optical energy between the fiber 28 and an optical device, there are some significant disadvantages. First, the system is not very compact because of the orientation of the fiber 28 to the surface 31 of the substrate 34. More importantly, the PR microlens 24 cannot withstand variable temperature cycles and long-term reliability of the system would be an issue.

In many cases external lenses are used to couple optical energy between optical fibers or waveguides and optical devices. Examples of such coupling techniques are disclosed in U.S. Pat. Nos.: 5,247,597; 4,653,847; 4,433,898; 4,875,750; and 5,343,546. Using external microlenses makes coupling extremely complex and in most cases unreliable.

As discussed, present optical coupling systems use a variety of coupling schemes to obtain efficient coupling between micro-optical devices. However, these schemes use many components, require a complicated assembly process, and are not compact. In addition, these components are typically made of different materials and have different thermal expansion coefficients. These differences can cause optical misalignment during temperature changes, which are common in military and space applications. Furthermore, when using discrete bulk optical components, the complexity of the assembly process is increased because there are more individual components to align. The greater the complexity the more assembly costs are increased and reliability decreased.

Based on techniques known in the art for optoelectronic coupling schemes, a monolithic optical microbench system for coupling optical energy between a fiber or a waveguide and an optical device is highly desirable.

SUMMARY OF THE INVENTION

It is an aspect of the present invention to provide a monolithic optical microbench system for the coupling of light between optical devices which includes a substrate wafer having a crystal plane; a mirror etched in the crystal plane of the substrate wafer; and a groove etched on a side of the substrate wafer intersecting the crystal plane of the mirror.

It is also an aspect of the present invention to provide a method for producing a monolithic optical microbench for the coupling of light between optical devices. The method comprises the steps of providing a substrate wafer having a first opposing surface, a second opposing surface, a first crystal plane, and a second crystal plane; lapping the entire first opposing surface of the substrate wafer and polishing the entire first opposing surface of the substrate wafer; coating a first layer of photoresist material over the entire first opposing surface of the substrate wafer and coating a second layer of photoresist material over the entire second opposing surface of the substrate wafer; baking the first opposing surface and the second opposing surface of the substrate wafer; providing a first mask to the first opposing surface and a second mask for the second opposing surface of the substrate wafer; selectively aligning the first mask to the first opposing surface and the second mask to the second opposing surface of the substrate wafer; exposing the first opposing surface of the substrate wafer coated with the first layer of photoresist material to a light source to form a first photoresist mask and exposing the second opposing surface of the substrate wafer coated with the second layer of photoresist material to a light source to form a second photoresist mask; developing the first opposing surface and the second opposing surface of the substrate wafer; etching the first opposing surface and the second opposing surface of the substrate wafer; removing the first photoresist mask and cleaning the first opposing surface of the substrate wafer and removing the second photoresist mask and cleaning the second opposing surface of the substrate wafer; and finally, metallizing the entire substrate wafer.

BRIEF DESCRIPTION OF THE DRAWINGS

Reference is now made to the following specification and attached drawings, wherein.

DETAILED DESCRIPTION OF THE INVENTION

Figure 1:
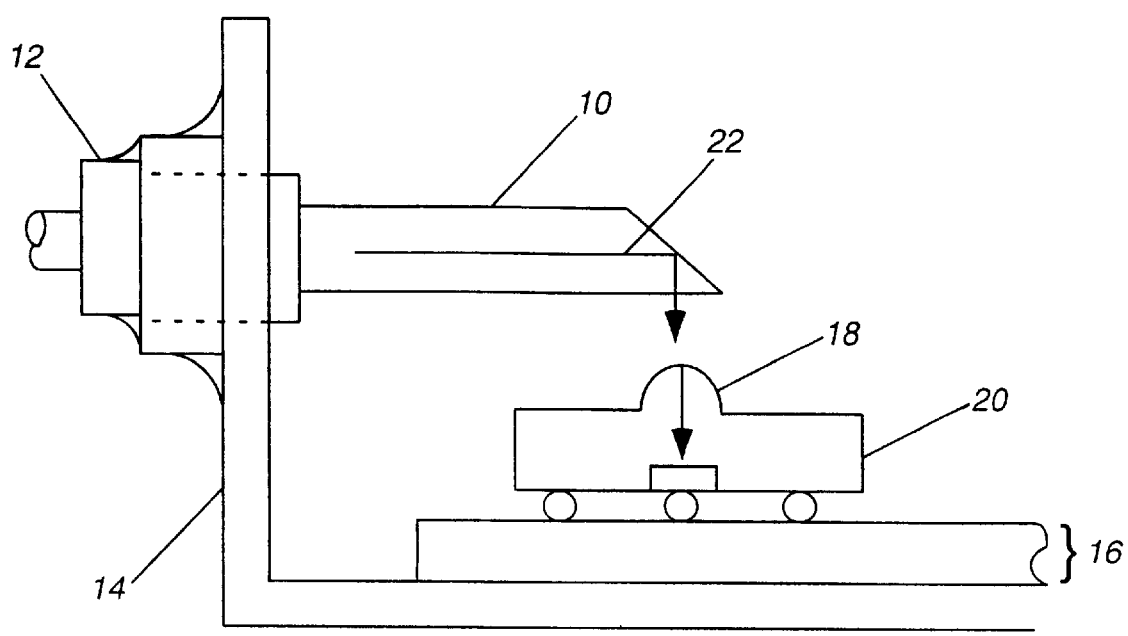
FIG. 1 is an illustration of a known optical coupling system which includes a mounted fiber assembly and a microlens monolithicaly integrated into a photodiode.
Figure 2:
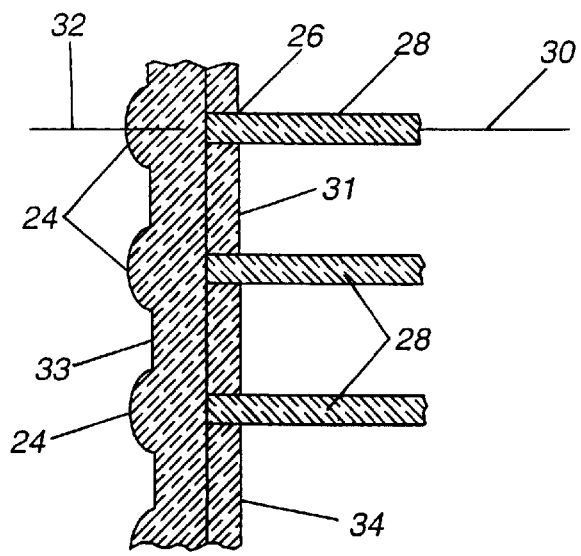
FIG. 2 is an illustration of another known optical coupling system which includes a plurality of microlenses formed on a surface of a substrate and corresponding optical fiber guides formed on an opposing surface of the substrate.

Briefly, the present invention relates to III-V semiconductor monolithic optical microbench and a method for producing the same for coupling optical energy between optical devices. The microbench, which is a monolithic assembly, can accurately align optical fibers or waveguides, and redirect and focus optical energy to and from optical devices using a reflective surface. The construction of the microbench system is accomplished by using the anisotropic etch characteristics of III-v semiconductors. Etching in one direction creates a natural channel for precise fiber positioning; etching in another direction, which is orthogonal to the first direction, creates a reflective surface at one end of the fiber channel for redirecting and focusing optical energy. The ability to form a monolithic compact and simple optical coupling system for micro-optical devices has several advantages. First, because the microbench can be made of the same semiconductor material as the device, there is better thermal expansion match between the microbench and the micro-optical device. Having the best thermal expansion match is important for stability where differences in thermal expansion coefficients can cause optical misalignments during temperature changes. Further, efficient coupling can be accomplished between a fiber, reflective surface, and the device without the use of complex coupling and alignment schemes which require many components and complicated assembly processes. Other advantages include redirection and focusing of optical energy using one optical component, lower loss and spherical aberrations using front surface reflectors compared to refractive lenses, compact construction and reduced package profile, very accurate alignment of reflector to optical devices, decrease in the time required for alignment of the reflector to the micro-optical device by passive alignment, expandability to integrate multiple reflectors into one structure, and providing for more efficient packaging of optical electronics systems. Finally, very precise fabrication is possible by using standard photolithographic processes and wafer level fabrication can result in high volume manufacturing and high reproducibility.

As previously mentioned, the present invention relates to an improvement in the coupling of optical energy between optical devices. Present optical systems use a variety of coupling schemes which can be very complex and unreliable. In order to produce less complex more efficient coupling between optical fibers or waveguides and micro-optical devices, a reflective mirror and fiber groove can be formed monolithically from the same semiconductor material to form a microbench. Monolithic integration allows for accurate alignment of optical fibers to efficiently couple energy between the microbench and optical devices. Additionally, because the microbench material is the same material as the optical devices similar thermal expansion properties make the resulting optical coupling more reliable.

It should be understood by those of ordinary skill in the art that the principles of the present invention are applicable to many types of reflective mirrors and micro-optical devices, such as flat mirrors, paraboloidal mirrors, waveguide devices, diode laser devices, fiber optical devices, photodiode devices, and optical integrated circuits. The principles of the present invention are also applicable to many types of III-v semiconductors, such as indium phosphide (InP), gallium arsenide (GaAs), indium arsenide (InAs), and gallium phosphide (GaP) and/or silicon.

Figure 3:
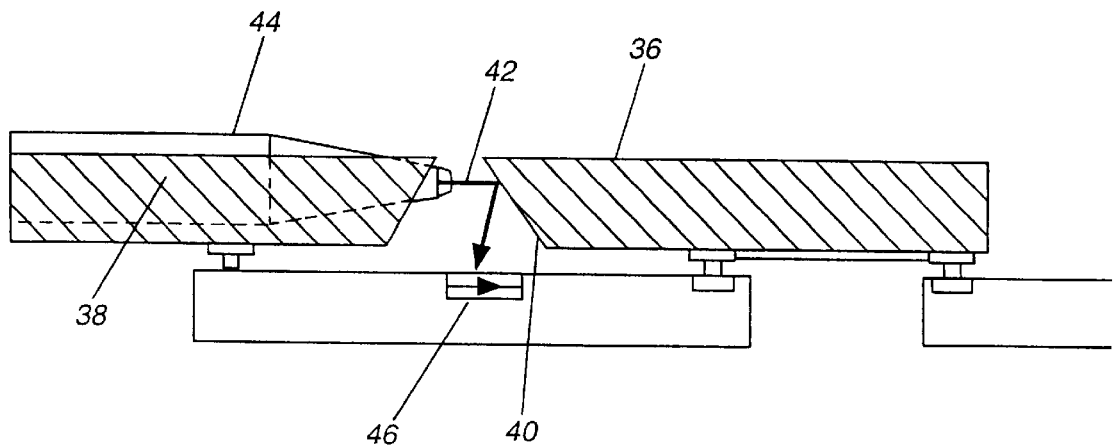
FIG. 3 is a side view illustration of the optical microbench system in accordance with the present invention.

The present invention relates to an optical mircobench system and, more particularly, to an optical microbench system which includes a III-V semiconductor substrate 36, such as indium phosphide (InP), a fiber groove 38, and a reflective mirror 40, as illustrated in FIG. 3. An important aspect of the invention is the monolithic integration of the microbench system. The fiber groove 38 provides a natural channel for precise optical fiber positioning where optical energy 42 is emitted from an optical fiber 44 and redirected at the reflective mirror 40 for collection at an optical detector device 46. It should be understood that the principles of the present invention are also applicable for coupling optical energy from a waveguide to an optical device. It should filter be understood that the reflective mirror can be used for redirecting and focusing the diverging output of optical energy from an emitter or waveguide, or it can be used for collecting the optical energy coming to the input of a waveguide or detector.

For illustration, a method for producing the monolithic optical microbench system is described and illustrated further in FIG. 4, FIGS. 5a through 5m, and FIG. 6 with a substrate wafer 48, a groove 82, and reflective mirrors 66 and 68.

Figure 4:
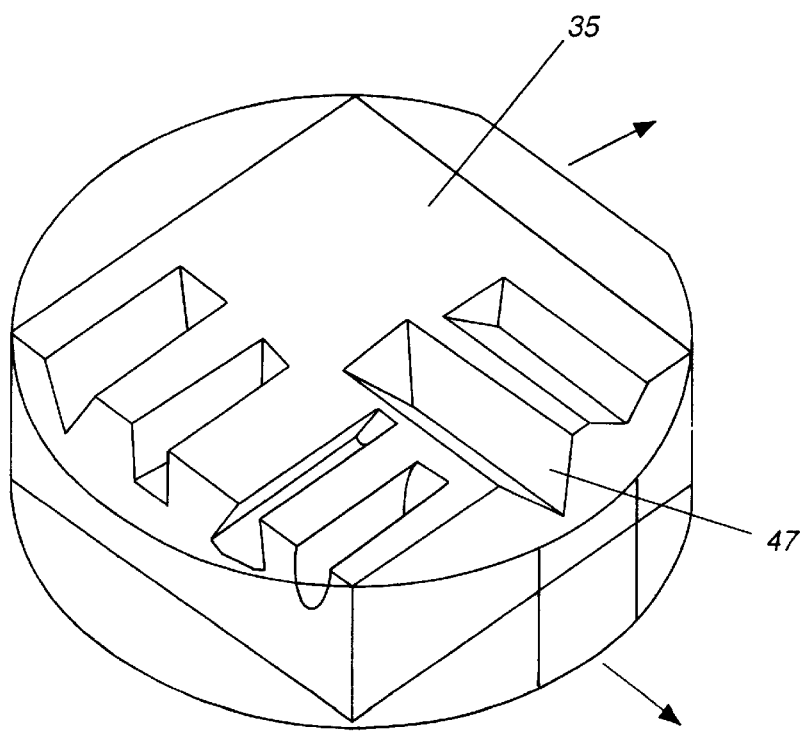
FIG. 4 is an illustration of the natural crystal planes of III-V semiconductor substrates.

More specifically, and with reference to the drawings, the first steps of the microbench fabrication, as illustrated in FIG. 4, FIGS. 5a through 5m, and FIG. 6, relate to the formation of a groove and a reflective mirror from semiconductor material by standard photolithography processes. The construction of the microbench is accomplished by exploiting the anisotropic etch characteristics of III-v semiconductors. The unique crystal plane properties, as illustrated in FIG. 4, of III-V semiconductor material allow for the preferential etching of reflective surfaces in one (111) crystal plane 47 of a substrate and to etch an intersecting groove on an opposite (100) crystal plan 35 of the substrate.

Figure 5A:
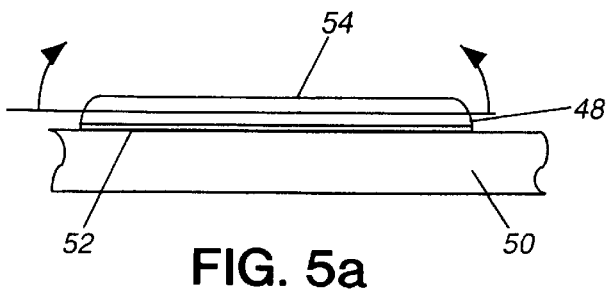
FIG. 5a is a side view illustration of the lapping and polishing of the substrate in accordance with the present invention.

The first step of the microbench fabrication process involves lapping the entire first opposing surface 54 of an indium phosphide (InP) substrate wafer 48 and polishing the entire first opposing surface 54 to a thickness of from approximately 135 to 175 microns, as illustrated in FIG. 5a. The lapping and polishing steps are performed to provide the substrate wafer 48 with a desired thickness and are performed while the substrate wafer 48 is secured by means such as the wax 52 on a carrier 50.

Figure 5B:
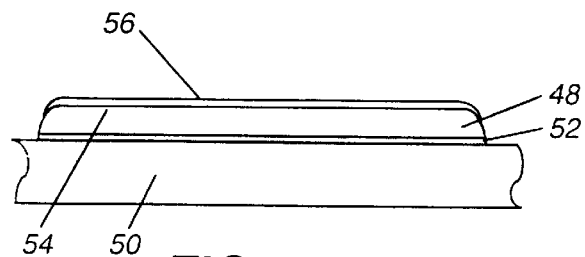
FIG. 5b is a side view illustration of the substrate coated with a layer of photoresist material to begin the formation of a reflective surface through photolithography steps in accordance with the present invention.

Following the lapping and polishing steps are the reflective mirror fabrication steps. The first step of the reflective mirror fabrication process, as illustrated in FIG. 5b, is coating a layer of photoresist material 56 over the entire first surface 54 of the indium phosphide (InP) substrate wafer 48.

The preferred photoresist material 56 is 2-ethoxpyethylacetate (60%) and n-butyl acetate (5%) in xylene and hexamethyldisilozane (HDMS), and is preferred for its suitability for use with a variety of etching techniques. The indium phosphide substrate wafer 48 is chosen for its crystallographic etching characteristics. It is important to note that other materials can be used for the substrate wafer 48 and the photoresist coating 56. For example, the substrate wafer 48 may be any III-v semiconductor material and may include gallium arsenide (GaAs), indium arsenide (InAs), and gallium phosphide (GaP). The photoresist coating material 56 may include 2-ethoxyethylacetate+n-butyl acetate in xylene solvent, 2-ethoxyethylacetate+n-butyl acetate in xylene and silicon dioxide ($SiO_2$), 2-ethoxyethylacetate+n-butyl acetate in xylene and silicon nitride ($Si_3N_4$), silicon dioxide ($SiO_2$) and complex silicon nitride ($Si_xN_y$), or aluminum oxide ($Al_2O_3$).

After coating the layer of photoresist material 56 over the first surface 54 of the substrate wafer 48, the substrate wafer 48 is soft baked at a temperature of approximately 100° C. and for a period of approximately 45 minutes to remove any solvent from the photoresist material 56.

Figure 5C:
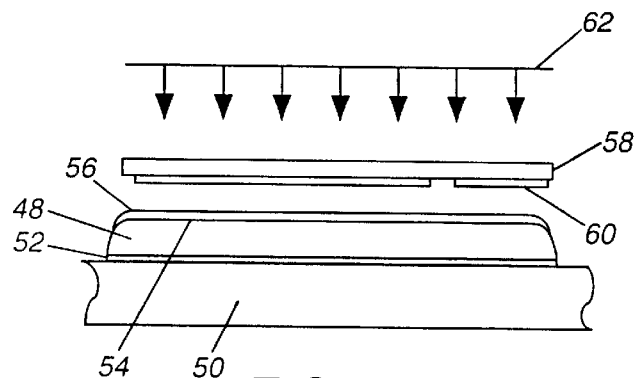
FIG. 5c is a side view illustration of the substrate wafer which includes a layer of photoresist material on a surface of the substrate wafer and the layer of photoresist material is exposed by an ultra-violet light source through a mask to later form a reflective mirror in accordance with the present invention.
Figure 5D:
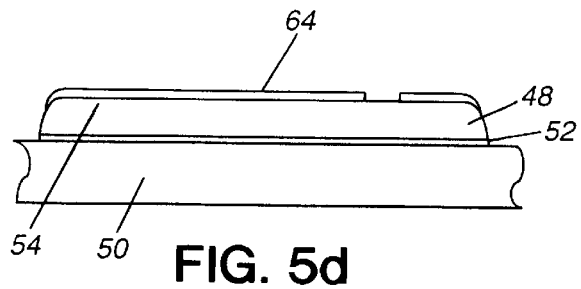
FIG. 5d is a side view illustration of the substrate wafer and a photoresist mask formed on the surface of the substrate following the exposure of the substrate wafer to the ultra-violet light source in accordance with the present invention.

Next, as illustrated in FIG. 5c, a pattern mask 58 is used to transfer a reflective mirror pattern 60 from the mask 58 to the substrate wafer 48. The mask 58 is aligned to the substrate wafer 48 and the layer of photoresist material 56 is then exposed to an ultra violet UV light source 62 through the mask 58 to transfer the reflective mirror pattern 60 to the photoresist material 56. Next, as illustrated in FIG. 5d, the layer of photoresist material 56 of FIG. 5c is developed to form a photoresist mask 64 on the first surface 54 of the substrate wafer 48. The development of photoresist material is a standard step in photolithography processing. Alternatively, if the substrate wafer 48 is precoated using $SiO_2$, $Si_3N_4$, $Si_xN_y$, $Al_2O_3$ or similar materials, the portions of the precoat layer not covered by the photoresist material 56 must be etched away by plasma or buffer HF (buffer hydrogen flouride) etching before proceeding to the preferential etching steps which follow.

Figure 5E:
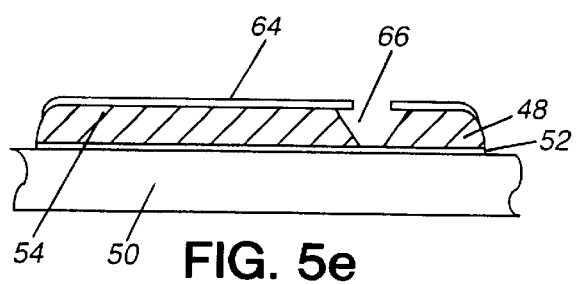
FIG. 5e is a cross-sectional side view illustration of the preferentially etched surface of the substrate wafer where a flat reflective mirror is formed in accordance with the present invention.
Figure 5F:
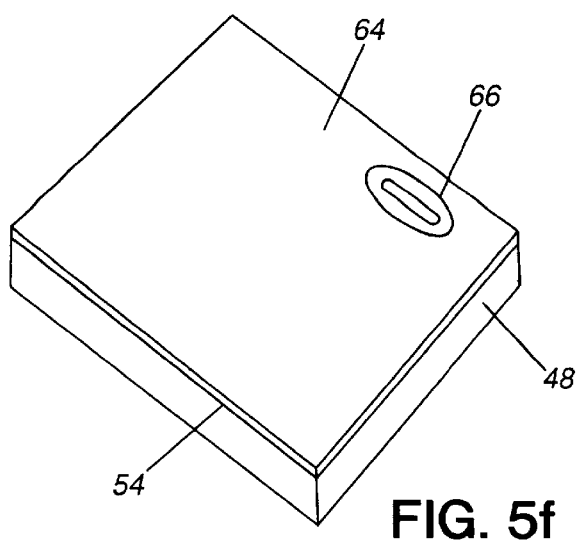
FIG. 5f is a top view of the preferentially etched surface of the substrate wafer where a flat reflective mirror is formed in accordance with the present invention.

Following the previously mentioned photolithography steps, the substrate wafer 48 is preferentially etched in the areas not protected by the photoresist mask 64, as illustrated in FIGS. 5e and 5f, to form a flat reflective mirror 66. This preferential etching step is done by a wet-chemical etch process where the substrate 48 is etched in an orthogonal direction along the (111) first crystal plane 47 illustrated in FIG. 4. The unique crystal plane properties of III-V semiconductor material allows for the preferential etching of flat angled reflective surfaces of between 36 and 53 degrees, as illustrated in the preferred embodiment. For the purposes of the preferred embodiment, the surface 54 of the substrate wafer 48 shown in FIG. 5e is wet-chemically etched in a deionized water:potassium dichromate:acetic acid:hydrobromic acid ($H_2O:K_2Cr_2O_7:H_3CCOOH:HBr$), 450 ml:66 g:100 ml:300 ml solution at a temperature of from 40° C. to 60° C. Alternative wet-chemical etch solutions may include bromine:methanol ($Br_2:H_3COH$), bromine:isopropanol ($Br_2:H_5C_2OH$), deionized water:hydrobromic acid:acetic acid ($H_2O:HBr:H_3CCOOH$), deionized water:potassium dichromate:sulfuiic acid:hydrochloric acid ($H_2O:K_2Cr_2O_7:H_2SO_4:HCl$), phosphoric acid:hydrochloric acid ($H_3PO_4:HCl$), phosphoric acid:hydrochloric acid:deionized water ($H_3PO_4:HCl:H_2O$), phosphoric acid:hydrochloric acid:hydrogen peroxide ($H_3PO_4:HCl:H_2O_2$), iron chloride:hydrochloric acid ($FeCl_3:HCl$) under illumination, potassium periodide:hydrochloric acid ($KIO_3:HCl$), hydrochloric acid: acetic acid:hydrogen peroxide (HCl:acetic acid:H₂O₂), hydrochloric acid:hydrogen peroxide:deionized water (HCl:H₂O₂:H₂O), sulfuric acid:hydrogen peroxide:deionized water (H₂SO₄:H₂O₂:H₂O), citric acid:hydrogen peroxide:deionized water (citric acid:H₂O₂:H₂0), bromine:methanol (Br₂:CH₃OH), nitric acid:hydrofluoric acid::deionized water (HNO₃:HF:H₂O), or hydrogen peroxide:amonium hydroxide:deionized water (H₂O₂:NH₄OH:H₂O).

Figure 6:
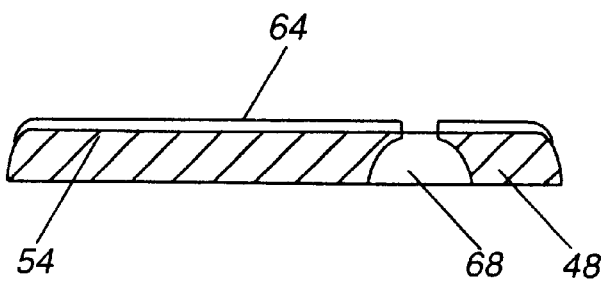
FIG. 6 is a cross-sectional side view illustration of an alternate embodiment of the present invention where a curved reflective mirror is formed in accordance with the present invention.

Alternatively, as illustrated in FIG. 6, a curved reflective mirror 68 can be formed by non-selective etching the substrate wafer 48 using the same wet-chemical etch solution previously mentioned at a temperature of from approximately 60 to 65° C. The photoresist layer used for non-selective etching is baked at a temperature of approximately 150° C. so that the photoresist mask can withstand high etching temperatures where the etching temperatures are greater than approximately 60° C.

Figure 5G:
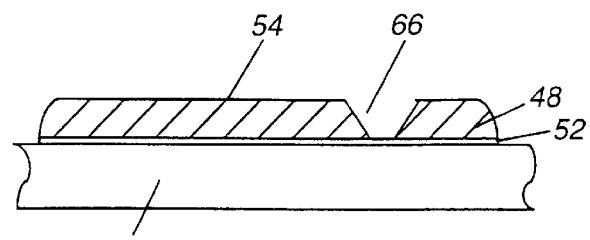
FIG. 5g is a cross-sectional side view illustration of the substrate of FIG. 5f where the photoresist has been removed from the surface of the substrate.

Following the etching of the surface 54 of the substrate wafer 48 to form the flat reflective mirror 66, the photoresist mask 64 is removed from the surface 54 of the substrate wafer 48, as illustrated in FIG. 5g. The photoresist mask 64 is removed and the surface 54 of the substrate wafer 48 is cleaned by first removing the photoresist mask 64 using acetone. Following the removal of the photoresist mask 64, the acetone is removed from the surface 54 of the substrate wafer 48 with isopropanol and the isopropanol is removed from the surface 54 of the substrate wafer 48 using deionized water. Finally, oxides and photoresist residual are removed from the surface 54 of the substrate wafer 48 using potassium hydroxide (KOH) and etch residue is removed from the surface 54 of the substrate wafer 48 using a solution of sulfuric acid:hydrogen perodixe:deionized water (H₂SO₄:H₂O₂:H₂O).

As previously mentioned, the monolithic integration of a reflective surface and a groove is significant. Monolithic integration allows for more reliable and less complex optical alignment between optical devices. To complete the monolithic integration, a groove is formed on a surface of a substrate wafer opposite the surface where the reflective mirror has been formed.

Figure 5H:
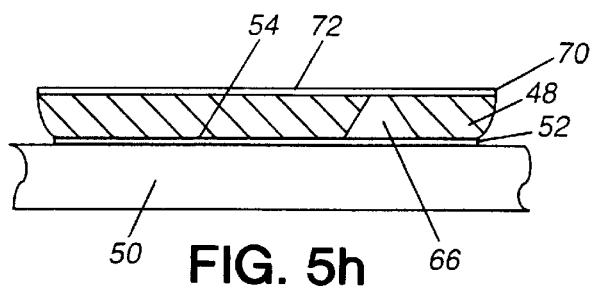
FIG. 5h is a cross-sectional side view illustration of the substrate wafer coated with a layer of photoresist material to begin the formation of a groove through photolithography steps on the surface opposite where the flat reflective mirror is formed in accordance with the present invention.

As illustrated in FIG. 5h, the substrate wafer 48 is demounted from the carrier 50, and remounted to the carrier 50 using the wax material 52, thereby exposing the surface 70 of the substrate wafer 48. The surface 70 of the substrate wafer 48 is cleaned using solvent to remove any wax residue. The first steps in the fabrication of the groove are photolithography steps. The first photolithography step includes coating a layer of photoresist material 72 over the entire surface 70 of the substrate wafer 48 opposite the surface 54 of the substrate wafer 48 where the flat reflective mirror 66 has previously been formed. The preferred photoresist material 72 is 2-ethoxyethylacetate+n-butyl acetate in xylene. Next, the substrate wafer 48 is soft baked at a temperature of approximately 100° C. for a period of approximately 45 minutes to remove solvents from the photoresist material 72.

Figure 5I:
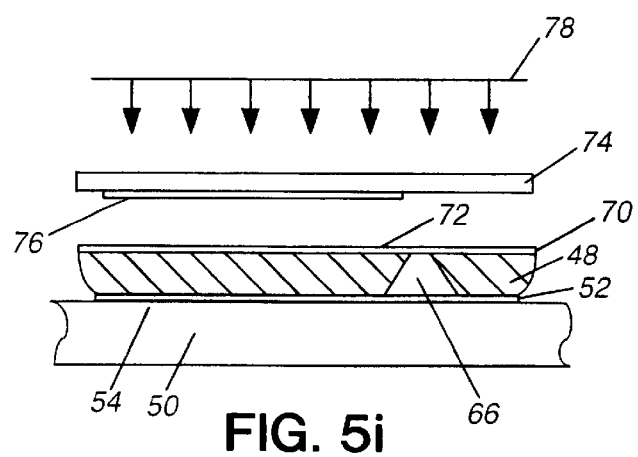
FIG. 5i is a side view illustration of the substrate wafer which includes a layer of photoresist material on a surface of the substrate wafer and the layer of photoresist material is exposed by an ultra-violet light source through a mask to later form a groove in accordance with the present invention.

As further illustrated in FIG. 5i, a mask 74 is used to transfer a groove pattern 76 to the layer of photoresist material 72. The mask 74 is selectively aligned to the substrate wafer 48. Using standard photolithography steps, the layer of photoresist material 72 is exposed with an ultra-violet light source 78 through the mask 74.

Figure 5J:
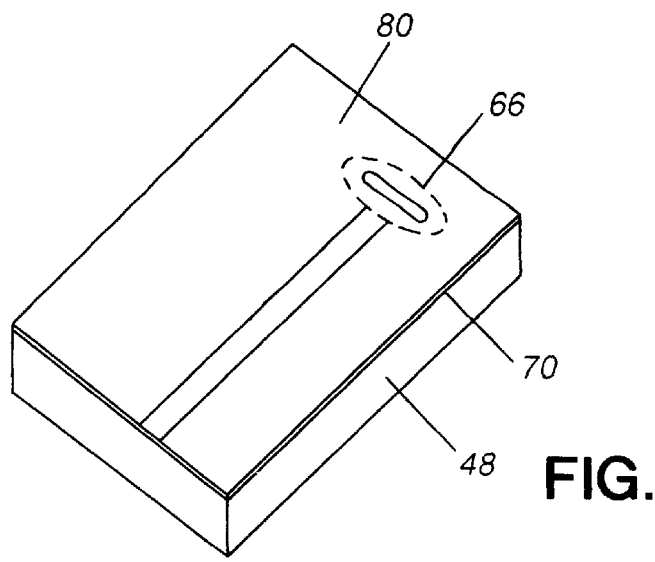
FIG. 5j is a top view illustration of the substrate wafer and a photoresist mask formed on the surface of the substrate following the exposure of the substrate wafer to the ultra-violet light source in accordance with the present invention.
Figure 5K:
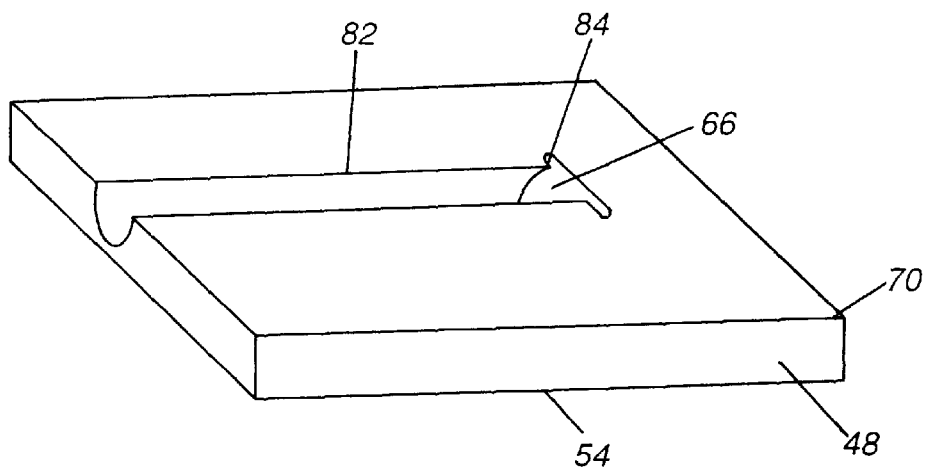
FIG. 5k is a top view illustration of the substrate wafer with an etched groove intersecting the plane of the etched flat reflective mirror in accordance with the present invention.
Figure 5L:
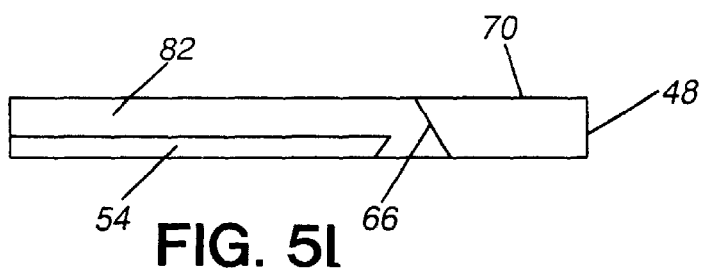
FIG. 5l is a side view illustration of the substrate wafer with an etched groove intersecting the plane of the etched flat reflective mirror in accordance with the present invention.

The layer of photoresist material 72 is developed creating a photoresist mask 80 on the surface 70 of the substrate wafer 48, as shown in FIG. 5j. The surface 70 of the substrate wafer 48 containing the photoresist mask 80 is wet-chemically etched in the areas not protected by the photoresist mask 80 to form the groove 82, as shown in FIGS. 5k and 5l. The groove 82 is etched on the (100) crystal plane 35, shown in FIG. 4, of the substrate wafer in an orthogonal direction such that the end 84 of the groove 82 intersects the plane of the flat reflective mirror 66. Because of the anisotropic etch characteristics of the substrate wafer 48, the groove 82 is formed in a semi-circular shape, as shown in FIG. 5k. The semi-circular shape of the groove 82 allows for increased stability during thermal expansion of the microbench system because the semi-circular groove 82 allows more surface area contact with round optical fibers than equivalent v-groove structures.

Following the formation of the groove 82, the photoresist mask 80 is removed from the surface 70 of the substrate wafer 48 and the surface 70 of the substrate wafer 48 is cleaned, using the same steps illustrated in the formation of the flat reflective mirror.

Figure 5M:
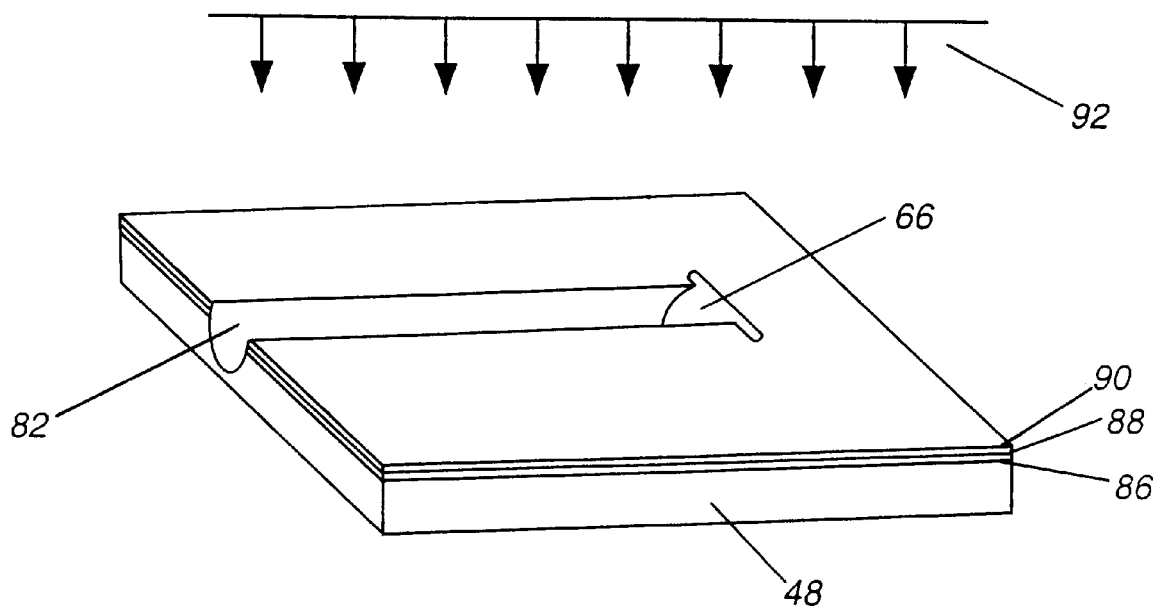
FIG. 5m is an illustration of the substrate wafer metallization process in accordance with the present invention.

To secure the microbench system to a micro-optical device, the entire substrate 48 is metallized by first evaporating 92 a layer 86 of titanium (Ti) over the entire substrate wafer 48, evaporating 92 a layer of platnium (Pt) 88 over the layer 86 of titanium, evaporating 92 a layer 90 of gold (Au) over the layer 88 of platnium, and applying a standard alloy treatment to the metal layers to bond the layers for better adhesion, as illustrated in FIG. 5m.

Figure 7:
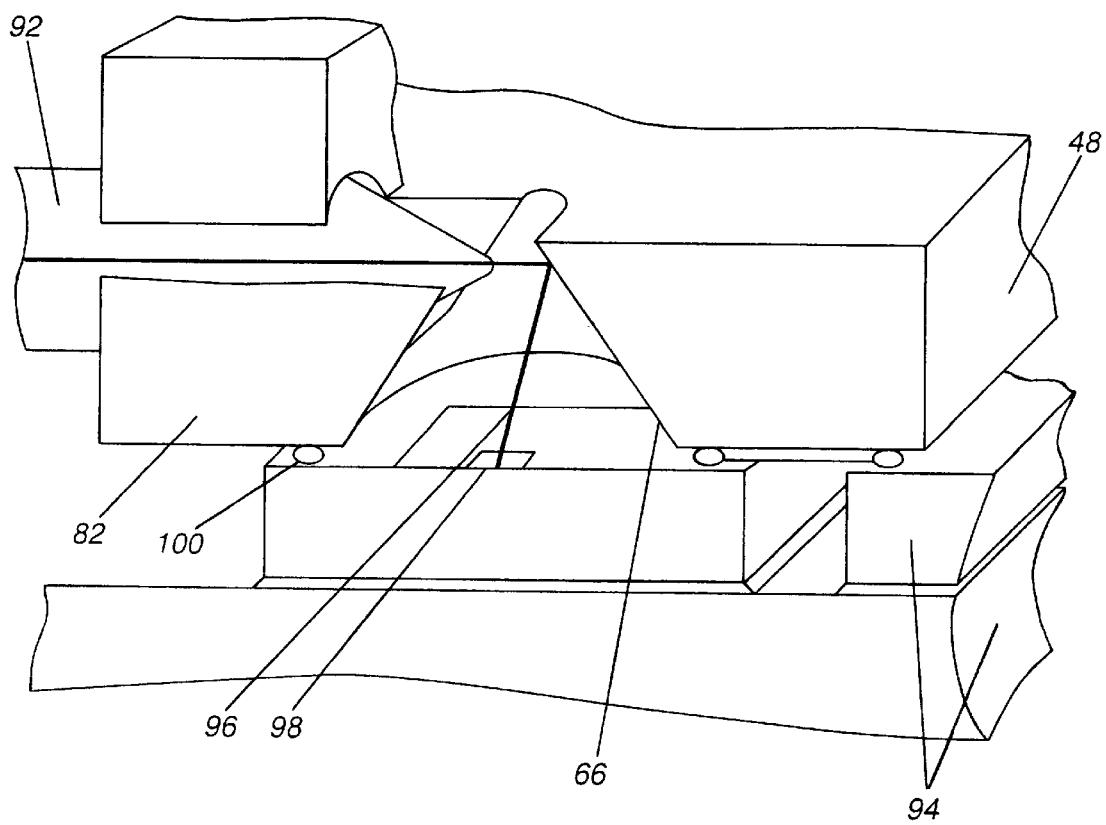
FIG. 7 is an illustration of the microbench system in accordance with the present invention.

Finally, as shown in FIG. 7, an optical fiber 92 and the substrate wafer 48 are secured using eutectic bonds 100. The optical fiber 92 is secured in the groove 82 and the substrate wafer 48 is mounted to optical devices 94. An optical signal 96 is emitted from the optical fiber 92 and is reflected at the flat reflective mirror 66 to an optically active area 98.

Obviously, many modifications and variations of the present invention are possible in light of the above teachings. Thus, it is to be understood that, within the scope of the appended claims, the invention may be practiced otherwise than as specifically described above.

What is claimed is:

1. A method for producing a monolitic optical microbench for the coupling of light between optical devices, said method comprising the steps of:

providing a III-V semiconductor substrate wafer having a first surface, a second surface opposite the first surface, a first crystal plane, and a second crystal plane;

lapping the entire first surface of the substrate wafer and polishing the entire first surface of the substrate wafer;

coating a first layer of photoresist material over the entire first opposing surface of the substrate wafer and coating a second layer of photoresist material over the entire second opposing surface of the substrate wafer;

baking first layer and the second layer of photoresist material at a temperature of substantially 150° C.;

providing a first mask for the first opposing surface and a second mask for the second opposing surface of the substrate wafer;

selectively aligning the fist mask to the it opposing surface and the second mask to the second opposing surface of the substrate wafer;

exposing the first opposing surface of the substrate wafer coated with the first layer of photoresist material to a light source to form a first photoresist mask and exposing the second opposing surface of the substrate wafer coated with the second layer of photoresist material to a light source to form a second photoresist mask;

developing the first opposing surface and the second opposing surface of the substrate wafer;

etching the first opposing surface of the substrate wafer at a temperature substantially from 60° C. to 65° C. to form a curved reflective mirror;

etching the second opposing surface of the substrate wafer to form a groove intersecting a plane of the curved reflective mirror;

removing the first photoresist mask and cleaning the first opposing surface of the substrate wafer and removing the second photoresist mask and clang the second opposing surface of the substrate wafer; and metallizing the entire substrate wafer.

2. The method as recited in claim 1, wherein providing the substrate wafer further comprises providing the substrate wafer of a III-V semiconductor material selected from the group consisting of gallium arsenide (GaAs), gallium phosphide (GaP), indium phosphide (InP), or indium arsenide (INAs).

3. The method as recited in claim 1, wherein providing the substrate wafer having the first and the second crystal planes further comprises providing the substrate wafer having a (100) first crystal plane.

4. The method as recited in claim 1, wherein providing the substrate wafer having the first and the second crystal planes further comprises providing the substrate wafer having a (111) second crystal plane.

5. The method as recited in claim 1, wherein etching the first opposing surface of the substrate wafer to form the curved reflective mirror farther comprises non-selectively etching the first opposing surface of the substrate wafer to form the curved reflective mirror.

6. The method as recited in claim 5, wherein non-selectively etching the first opposing surface of the substrate wafer to form the curved reflective mirror further comprises etching on the second crystal plane of the substrate wafer.

7. The method as recited in claim 1, wherein providing the second opposing surf etching the second opposing surface of the substrate wafer to form the groove further comprises forming the groove to intersect the second crystal plane of the substrate wafer.

8. The method as recited in claim 7, wherein forming the groove further comprises providing the groove to position an optical fiber therein.

9. The method as recited in claim 7, wherein forming the groove further comprises non-selectively etching the second opposing surface of the substrate wafer to form the groove.

10. The method as recited in claim 9, wherein non-selectively etching the second opposing surface of the substrate wafer to form the groove further comprises non-selectively etching the second opposing surface of the substrate wafer to form the groove having a semi-circular cross-section.

11. The method as recited in claim 1, wherein lapping and polishing the entire first opposing surface of the substrate wafer further comprises lapping the substrate wafer to a thickness of approximately 135 to 175 microns.

12. The method as recited in claim 1, wherein selectively aligning the first mask to the substrate wafer over the first opposing surface and the second mask to the substrate wafer over the second opposing surface further comprises aligning the first and the second mask along the first crystal plane of the substrate wafer.

13. The method as recited in claim 1, wherein etching the first and the second opposing surfaces of the substrate wafer further comprises wet-chemical etching.

14. The method as recited in claim 1, wherein etching the first and the second opposing surfaces of the substrate wafer further comprises providing a wet chemical etch solution selected from the group consisting of deionized water:potassium dichromate:acetic acid:hydrobromic acid ($H_2O:K_2Cr_2O_7:H_3CCOOH:HBr$), bromine:methanol ($Br_2:H_3COH$), bromine:isopropanol ($Br_2:H_5C_2OH$), deionized water:hydrobromic acid:acetic acid ($H_2O:HBr:H_3CCOOH$), deionized water-potassium dichromate:sulfuric acid:hydrochloric acid ($H_2O:K_2Cr_2O_7:H_2SO_4:HCl$), phosphoric acid:hydrochloric acid ($H_3PO_4;HCl$), phosphoric acid:hydrochloric acid: deionized water ($H_3PO_4:H_2O$), phosphoric acid:hydrochloric acid:hydrogen peroxide ($H^3PO_4:HCl:H_2O_2$), iron chloride:hydrochloric acid ($FeCl_3:HCl$) under illumination, potassium periodide:hydrochloric acid ($KIO_3:HCl$), hydrochloric acid:acetic acid:hydrogen peroxide (HCl:acetic acid:$H_2O_2$), hydrochloric acid:hydrogen peroxide:deionized water ($HCl:H_2O_2:H_2O$), sulfuric acid:hydrogen peroxide:deionized water ($H_2SO_4:H_2O_2:H_2O$), citric acid:hydrogen peroxide-deionized water (citric acid:$H_2O_2:H_2O$), bromine:methanol ($Br_2:CH_3OH$), nitric acid:hydrofloric acid: deionized water ($HNO_3:HF:H_2O$), and hydrogen peroxide: ammonium hydroxide:deionized water ($H_2O_2:NH_4OH:H_2O$).

15. The method as recited in claim 1, wherein the step of metallizing the entire substrate wafer comprises the steps of:

evaporating a layer of titanium (Ti) over the entire substrate wafer;

evaporating a layer of platinum (Pt) over the layer of titanium;

evaporating a layer of gold (Au) over the layer of platinum; and applying an alloy treatment to the titanium layer, the platinum layer, and the gold layer to adhere the surface of the substrate wafer to the layer of titanium, the layer of titanium to the layer of platinum, and the layer of platinum to the layer of gold.

* * * * *